(12) United States Patent
Tanaka et al.

(10) Patent No.: US 9,053,395 B2
(45) Date of Patent: Jun. 9, 2015

(54) IMAGE PROCESSOR, IMAGE PROCESSING METHOD, CONTROL PROGRAM AND RECORDING MEDIUM

(71) Applicant: OMRON Corporation, Kyoto (JP)

(72) Inventors: Kiyoaki Tanaka, Kizugawa (JP); Takayoshi Yamashita, Kizugawa (JP)

(73) Assignee: OMRON CORPORATION, Kyoto-shi (JP)

( * ) Notice: Subject to any disclaimer, the term of this patent is extended or adjusted under 35 U.S.C. 154(b) by 158 days.

(21) Appl. No.: 13/744,859

(22) Filed: Jan. 18, 2013

(65) Prior Publication Data
US 2013/0243243 A1 Sep. 19, 2013

(30) Foreign Application Priority Data
Mar. 15, 2012 (JP) ................................. 2012-059388

(51) Int. Cl.
G06K 9/00 (2006.01)
G06K 9/46 (2006.01)
G06K 9/62 (2006.01)
G06K 9/78 (2006.01)

(52) U.S. Cl.
CPC ................ *G06K 9/78* (2013.01); *G06K 9/6257* (2013.01)

(58) Field of Classification Search
CPC ........................ G06K 9/00456; G06K 9/46049
See application file for complete search history.

(56) References Cited

U.S. PATENT DOCUMENTS

| 2009/0116693 | A1 | 5/2009 | Yamamoto et al. |
| 2011/0026810 | A1* | 2/2011 | Hu ................................. 382/155 |
| 2011/0141304 | A1 | 6/2011 | Okamoto |

FOREIGN PATENT DOCUMENTS

| JP | 2005-100121 A | 4/2005 |
| JP | 2008-204103 A | 9/2008 |
| JP | 2011-124819 A | 6/2011 |

OTHER PUBLICATIONS

Extended European Search Report for Application No. 13000217.3, issued Feb. 6, 2015 (12 pages).

* cited by examiner

*Primary Examiner* — Amir Alavi
*Assistant Examiner* — Kenny Cese
(74) *Attorney, Agent, or Firm* — Nutter McClennen & Fish LLP; John J. Penny, Jr.

(57) ABSTRACT

An image processor is provided, the image processor including a general-purpose classifier that detects a predetermined large classification target; and a dedicated classifier that detects a small classification target which is a subdivision of the large classification target; an image acquisition part that acquires an image photographed by a camera; an image extracting part that extracts a registered image including a user-assigned domain from the photographed image; a dedicated classifier performing part that causes the dedicated classifier to perform detection processing to the registered image extracted; a dedicated classifier selector that selects the dedicated classifier having a highest index indicating superiority or inferiority of a detection result; and a classifier generator that generates a registered image classifier to detect a target included in the registered image by replacing some weak classifiers included in the selected dedicated classifier with weak classifiers included in the general-purpose classifier.

7 Claims, 6 Drawing Sheets

IMAGE PROCESSOR, IMAGE PROCESSING METHOD, CONTROL PROGRAM AND RECORDING MEDIUM

BACKGROUND OF THE INVENTION

1. Technical Field

The present invention relates to an image processor that detects targets such as a human and a pet from an image, an image processing method, a control program, and a recording medium.

2. Related Art

In recent years, a technology in which, during photographing, a human face and the like are detected to focus a digital camera on a detected target or to adjust a white balance of the detected target is provided on image processors, such as the digital camera. In the technology, it is desired that targets such as the human face can correctly be detected from the image. Therefore, various technologies of detecting a predetermined target have been developed.

For example, in a technology disclosed in Japanese Unexamined Patent Publication No. 2005-100121, sample data is analyzed to determine a kind and a determination condition of a feature quantity used in determination processing of determining whether target data is data having a specific content according to a desired balance between a determination accuracy and a computational load in the determination processing.

In a technology disclosed in Japanese Unexamined Patent Publication No. 2008-204103, based on teaching data, a combination of currently-used recognizers is adaptively updated in accordance with environment.

In a technology disclosed in Japanese Unexamined Patent Publication No. 2011-124819, a face pattern having a high matching degree with a registration pet image is extracted by referring to dictionary data, and processing of recognizing the registration pet image is performed based on the extracted face pattern.

At this point, in the conventional image processor, face detection processing is performed by a face detector that is a general-purpose detector for detecting a human face and a pet face and the like. In many cases, the face detector can detect the human face and the pet face, which are included in the photographed image. However, sometimes the face detector cannot detect some of the human faces and the pet faces. The user is caused to register the image including the target that cannot be detected by the general-purpose detector, and the desired target is detected based on the registered image, thereby solving the problem.

For example, it is assumed that the human and shiba-inu that is the pet are taken in the image, and that the face of the shiba-inu cannot be detected by the face detector that is the general-purpose detector. It is assumed that, in addition to the general-purpose detector, the image processor includes dedicated detectors, such as a shiba-inu classifier, a chihuahua classifier, and a dachshund classifier, which detect the target that is a subdivision of the detection target of the general-purpose detector.

At this point, the image processor performs the detection processing to the registered image using the dedicated detector, and sets the dedicated detector having the best detection result to the classifier that detects the target included in the registered image. Therefore, the target that cannot be detected by the general-purpose detector can be detected by performing the detection processing using the set classifier.

Usually a user registers only the target that cannot be detected by the general-purpose detector. Therefore, in the above example, the image processor performs the detection processing to the photograph in which the human and the shiba-inu are taken using both the general-purpose classifier and the classifier that detects the shiba-inu. Thus, the target that is not detected can be detected by registering the target. However, the number of classifiers that perform the detection processing increases with increasing number of registration targets. Therefore, unfortunately a processing load or a processing time increases in the conventional image processor.

The present invention has been devised to solve the problems described above, and an object thereof is to construct an image processor, an image processing method, a control program, and a recording medium, which reduce the processing amount or the processing time in the processing of detecting the target included in the registered image from a certain image.

SUMMARY

In accordance with one aspect of at least one embodiment of the present invention, an image processor includes: a general-purpose classifier configured to detect a predetermined large classification target, the general-purpose classifier including one or a plurality of weak classifiers in which a next-stage weak classifier performs detection processing to a preceding-stage output domain; a dedicated classifier configured to detect a small classification target which is a subdivision of the large classification target, the dedicated classifier including one or a plurality of weak classifiers in which a next-stage weak classifier performs the detection processing to the preceding-stage output domain; an image acquisition part configured to acquire a photographed image photographed by a camera; an image extracting part configured to extract a registered image including a domain assigned by a user from the photographed image; a dedicated classifier performing part configured to cause the dedicated classifier to perform the detection processing to the registered image extracted by the image extracting part; a dedicated classifier selector configured to select the dedicated classifier having a highest index indicating superiority or inferiority of a detection result; and a classifier generator configured to generate a registered image classifier to detect a target included in the registered image by replacing some weak classifiers included in the dedicated classifier selected by the dedicated classifier selector with the weak classifiers included in the general-purpose classifier.

In accordance with another aspect of at least one embodiment of the present invention, an image processing method for an image processor including a general-purpose classifier configured to detect a predetermined large classification target, the general-purpose classifier including one or a plurality of weak classifiers in which a next-stage weak classifier performs detection processing to a preceding-stage output domain; and a dedicated classifier configured to detect a small classification target which is a subdivision of the large classification target, the dedicated classifier including one or a plurality of weak classifiers in which a next-stage weak classifier performs the detection processing to the preceding-stage output domain, the image processing method includes the steps of: acquiring a photographed image photographed by a camera; extracting a registered image including a domain assigned by a user from the photographed image; causing the dedicated classifier to perform the detection processing to the registered image extracted in the image extracting step; selecting the dedicated classifier having a highest index indicating superiority or inferiority of a detection result; and generating a registered image classifier to detect a target included in the registered image by replacing some weak classifiers included in the dedicated classifier selected in the dedicated classifier selecting step with the weak classifiers included in the general-purpose classifier.

According to the configuration, the registered image classifier is generated by the combination of the weak classifier of the general-purpose classifier that cannot detect the target included in the registered image and the weak classifier of the dedicated classifier.

At this point, in the case where the target included in the registered image and the target that can be detected by the general-purpose classifier are detected from the photographed image, the image processor causes both the registered image classifier and the general-purpose classifier to perform the processing. The image processor causes the two classifiers to perform the processing. However, in the detection processing of the registered image classifier, it is not necessary that the weak classifier of the general-purpose classifier included in the registered image classifier perform the processing by use of the detection result of the weak classifier of the general-purpose classifier.

Therefore, in the image processor, advantageously the processing load or the processing time of the detection processing can be reduced in the case where the target included in the registered image and the target that can be detected by the general-purpose classifier are detected from the photographed image.

In the image processor according to at least one embodiment of the present invention, it is preferable that the classifier generator generates the registered image classifier by replacing the weak classifiers of the dedicated classifier selected by the dedicated classifier selector to a hierarchy in which the weak classifier of the general-purpose classifier can successfully detect the target in the registered image with the weak classifiers to the same hierarchy of the general-purpose classifier.

In the image processor according to at least one embodiment of the present invention, it is preferable the classifier generator generates the registered image classifier by replacing the weak classifiers to a predetermined hierarchy of the dedicated classifier selected by the dedicated classifier selector with the weak classifiers to the same predetermined hierarchy of the general-purpose classifier.

In the image processor according to at least one embodiment of the present invention, it is preferable that the dedicated classifier performing part outputs a hierarchy in which the dedicated classifier can successfully detect the target in the registered image, as the index in the case where each dedicated classifier does not output the output domain when the dedicated classifier performing part causes the dedicated classifier to perform the detection processing to the registered image, and the dedicated classifier selector selects the dedicated classifier having a largest number of hierarchies.

In the image processor according to at least one embodiment of the present invention, it is preferable that the classifier generator generates the registered image classifier using the weak classifiers of the dedicated classifier to the hierarchy in which the weak classifier can successfully detect the target in the registered image among the weak classifiers of the dedicated classifier selected by the dedicated classifier selector.

The image processor may be constructed by a computer. In this case, the present invention also includes a control program that constructs the image processor by the computer by causing the computer to act as each part of the image processor and a tangible, non-transitory computer-readable recording medium in which the control program is recorded.

As described above, the image processor includes: the image acquisition part configured to acquire the photographed image photographed by the camera; the image extracting part configured to extract the registered image including the domain assigned by the user from the photographed image; the dedicated classifier performing part configured to cause the dedicated classifier to perform the detection processing to the registered image extracted by the image extracting part; the dedicated classifier selector configured to select the dedicated classifier having a highest index indicating the superiority or inferiority of a detection result; and the classifier generator configured to generate the registered image classifier to detect the target included in the registered image by replacing some weak classifiers included in the dedicated classifier selected by the dedicated classifier selector with the weak classifiers included in the general-purpose classifier.

The image processing method comprising the steps of: acquiring the photographed image photographed by the camera; extracting a registered image including the domain assigned by the user from the photographed image; causing the dedicated classifier to perform the detection processing to the registered image extracted in the image extracting step; selecting the dedicated classifier having a highest index indicating the superiority or inferiority of the detection result; and generating a registered image classifier in order to detect the target included in the registered image by replacing some weak classifiers included in the dedicated classifier selected in the dedicated classifier selecting step with the weak classifiers included in the general-purpose classifier.

Therefore, in the case where the target included in the registered image and the target that can be detected by the general-purpose classifier are detected from the photographed image, advantageously the processing load or the processing time of the detection processing can be reduced.

DETAILED DESCRIPTION

Hereinafter, an embodiment of the present invention will be described with reference to FIGS. 1 to 6.
(Configuration of Image Processor)

An image processor according to an embodiment of the invention detects a predetermined target on an image. The target detected by the image processor is referred to as a detection target. As used herein, the detection target means any material object on the image, for example, an entire body, a face, an eye, a nose, a mouth, a hand, am arm, and a leg of a human, entire bodies and faces of animals, such as a dog, a cat, and a bird, entire vehicle bodies and tires of an automobile and a motor cycle, construction products, such as a building and a house, and natural objects such as a tree, a cloud, and the sun.

Any image processor may be used as long as the image processor detects the detection target on the image. Examples of the image processor include a digital camera, a digital video camera, a PC, a mobile phone, a PDA (Personal Digital Assistant), a game machine, a device that takes and prints a photograph, and a device that edits the image.

The image processor of the embodiment includes a classifier that detects the detection target from the input image. The image input to the classifier is referred to as an input image.

The classifier includes one or a plurality of weak classifiers. The weak classifier constituting the classifier determines whether one or a plurality of feature quantities in a predetermined domain of the input image fall within predetermined reference domains, and the weak classifier outputs the domain where the feature quantity falls within the reference domain. In other words, the weak classifier determines whether the detection target is included in the predetermined domain of input image, and the weak classifier outputs the domain where the detection target is determined to be included. The weak classifier may extract any feature quantity from the domain. For example, a luminance value, edge information, frequency characteristics, such as Gabor and Haar, luminance-gradient feature quantity, such as SIFT and HOG, and a combination thereof may be used as the feature quantity.

A sequence to perform processing is set in the weak classifiers, the next-stage weak classifier performs detection processing to the predetermined domain in the output domain output from the preceding-stage weak classifier. The first-stage weak classifier performs the detection processing to (a whole domain of) the input image inputted to the classifier. The output domain output from the final-stage weak classifier is an output of the classifier. In the case where the preceding-stage weak classifier outputs no output domain, the subsequent weak classifiers do not perform the detection processing.

Hereinafter the detection processing sequence of the weak classifier is referred to as a hierarchy. For example, it is assumed that the weak classifier that performs the seventh stage or step detection processing in the classifier is a weak classifier of hierarchy 7.

The detection processing of the classifier will specifically be described with reference to FIGS. 2 to 5. FIGS. 2 to 5 are views illustrating examples of the detection processing and detection results of the weak classifiers constituting the classifier. It is assumed that the classifier in FIGS. 2 to 5 includes 10 weak classifiers L1 to L10. It is also assumed that the classifier in FIGS. 2 to 5 is a dog classifier that detects a dog.

Figure 2:
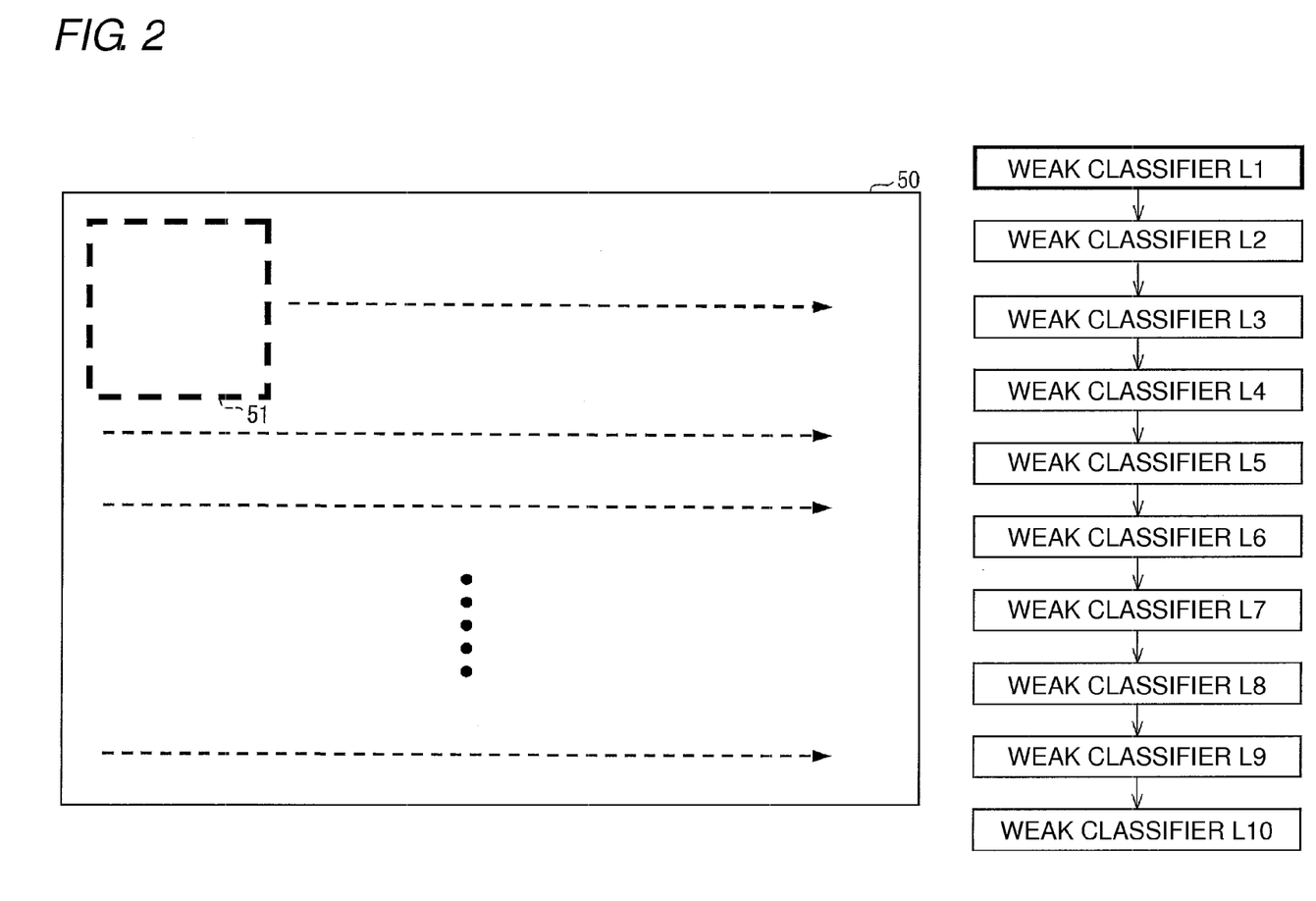
FIG. 2 is a view illustrating an example of detection processing and a detection result of a weak classifier constituting a classifier.

As illustrated in FIG. 2, the weak classifier L1 sets a domain 51 having a predetermined size and a predetermined shape in an input image 50 inputted to the classifier. The domain set by the weak classifier is referred to as a processing domain 51. The weak classifier L1 performs raster scan to the whole input image 50 using the processing domain 51, determines whether one or a plurality of feature quantities in each processing domain 51 falls within the predetermined reference domain, and outputs the processing domain 51 where the feature quantity falls within the predetermined reference domain as the output domain.

Figure 3:
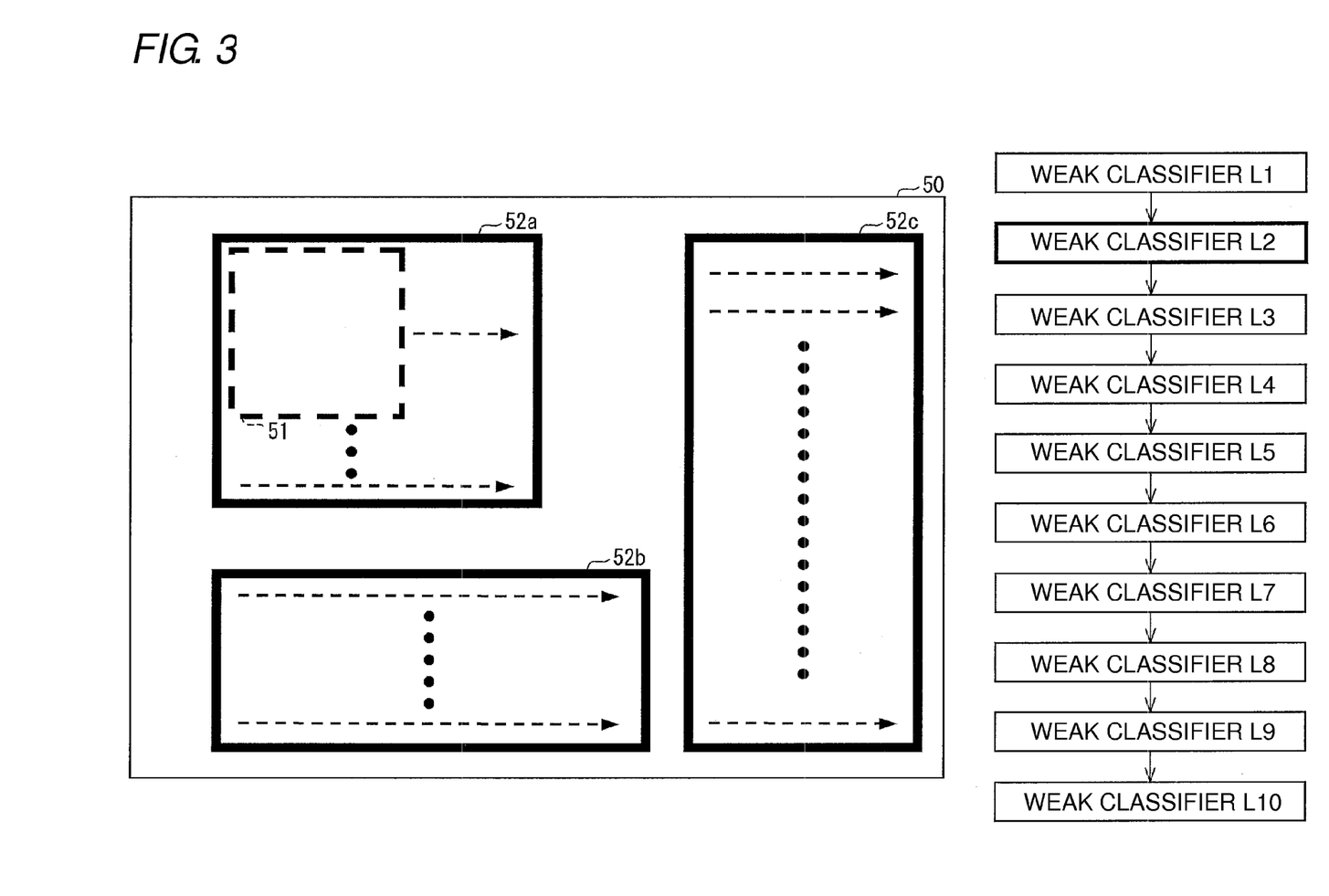
FIG. 3 is a view illustrating an example of detection processing and a detection result of a weak classifier constituting the classifier.

Here, as illustrated in FIG. 3, it is assumed that, as a result of the detection processing performed by the weak classifier L1, the weak classifier L1 outputs output domains 52a, 52b, and 52c as the output domain. In this state, the weak classifier L2 performs the detection processing by performing the raster scan to the output domains 52a, 52b, and 52c using the processing domain 51.

Figure 4:
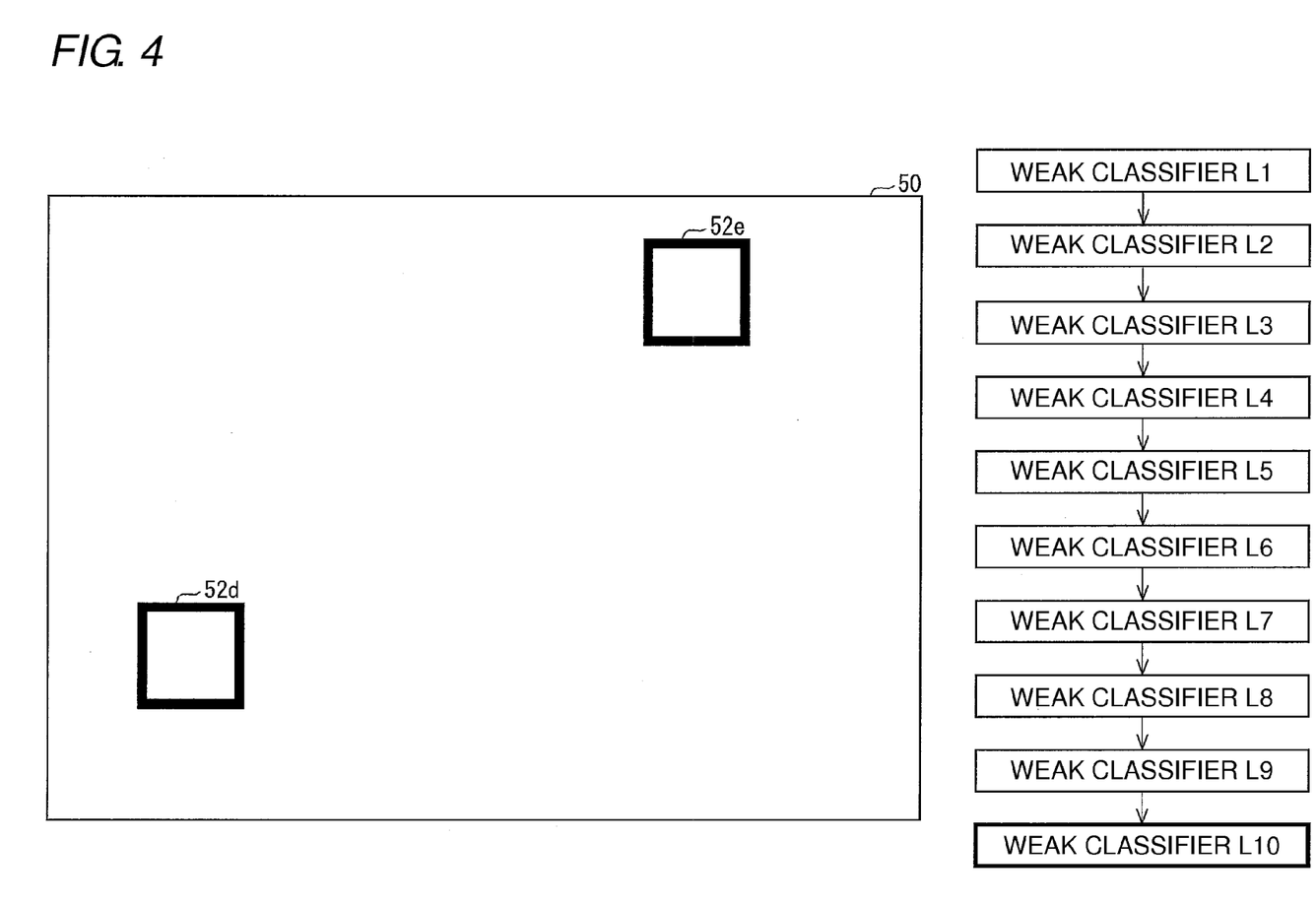
FIG. 4 is a view illustrating an example of detection processing and a detection result of a weak classifier constituting the classifier.

Then the weak classifiers L3 to L10 perform the detection processing, and the weak classifier L10 outputs output domains 52d and 52e as illustrated in FIG. 4. That is, the output domains 52d and 52e are obtained as the output when the dog classifier including the weak classifiers L1 to L10 performs the detection processing to the input image 50. A detection target of "dog" is included in the output domains 52d and 52e of the input image 50.

Figure 5:
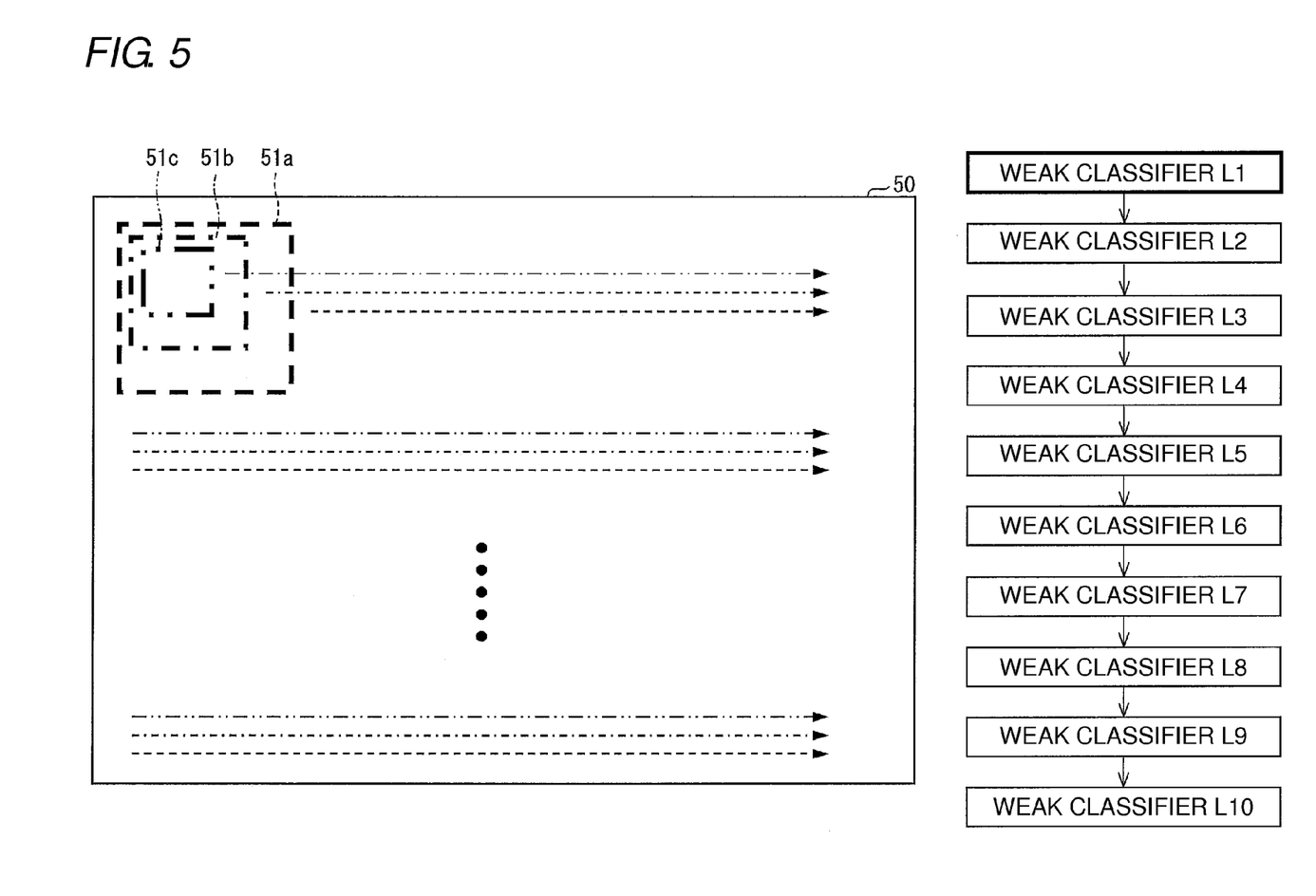
FIG. 5 is a view illustrating an example of detection processing and a detection result of the weak classifier constituting the classifier.

As illustrated in FIG. 5, the weak classifier may set processing domains 51a, 51b, and 51c having different sizes. The processing domain 51 has the rectangular shape in the example in FIGS. 2 to 5. However, the processing domain 51 is not limited to the rectangular shape. For example, the processing domain 51 may have a circular shape. The number of kinds of the processing domains set by the weak classifier may be set to any number, and the size and shape of the processing domain may arbitrarily be set. The set processing domain may vary in each weak classifier.

The image processor of the embodiment includes a general-purpose classifier and a dedicated classifier as classifiers. The dedicated classifier detects the target which is a subdivision of the detection target of the general-purpose classifier. In other words, the detection target of the general-purpose classifier is classified into predetermined segments and the detection target of the dedicated classifier is one of the segments. Hereinafter the detection target of the general-purpose classifier is referred to as a large classification target, and the detection target of the dedicated classifier is referred to as a small classification target.

For example, when the detection target of the general-purpose classifier is set to a "dog", the detection target of the dedicated classifier may be set to "shiba-inu", "chihuahua", and "dachshund" into which the dog is classified by a dog breed. In this case, the general-purpose classifier can detect the "dog" of any dog breed. However, the general-purpose classifier has average capabilities, such as a detection rate of the "dog" of each dog breed, compared with the dedicated classifier. The detection rate depends on the dog breed. On the other hand, because the dedicated classifier specializes in a specific dog breed, the dedicated classifier cannot detect the "dog" of any dog breed. However, the dedicated classifier has high capabilities, such as the detection rate of the "dog" of the specific dog breed (for example, shiba-inu) that is the detection target, compared with the general-purpose classifier.

The general-purpose classifier differs from the dedicated classifier only in the detection target. Whether a certain classifier is the dedicated classifier is relatively determined by the general-purpose classifier. That is, the dedicated classifier is correlated with the general-purpose classifier.

The image processor of the embodiment may include at least one general-purpose classifier and at least one dedicated classifier. There is no particular limitation to the number of weak classifiers constituting each of the general-purpose classifier and the dedicated classifier. The number of weak classifiers constituting the general-purpose classifier may differ from the number of weak classifiers constituting the dedicated classifier.

A detector is a term having the same meaning as the classifier, and the classifier is also referred to as a cascade. The weak classifier is also referred to as a layer.

Figure 1:
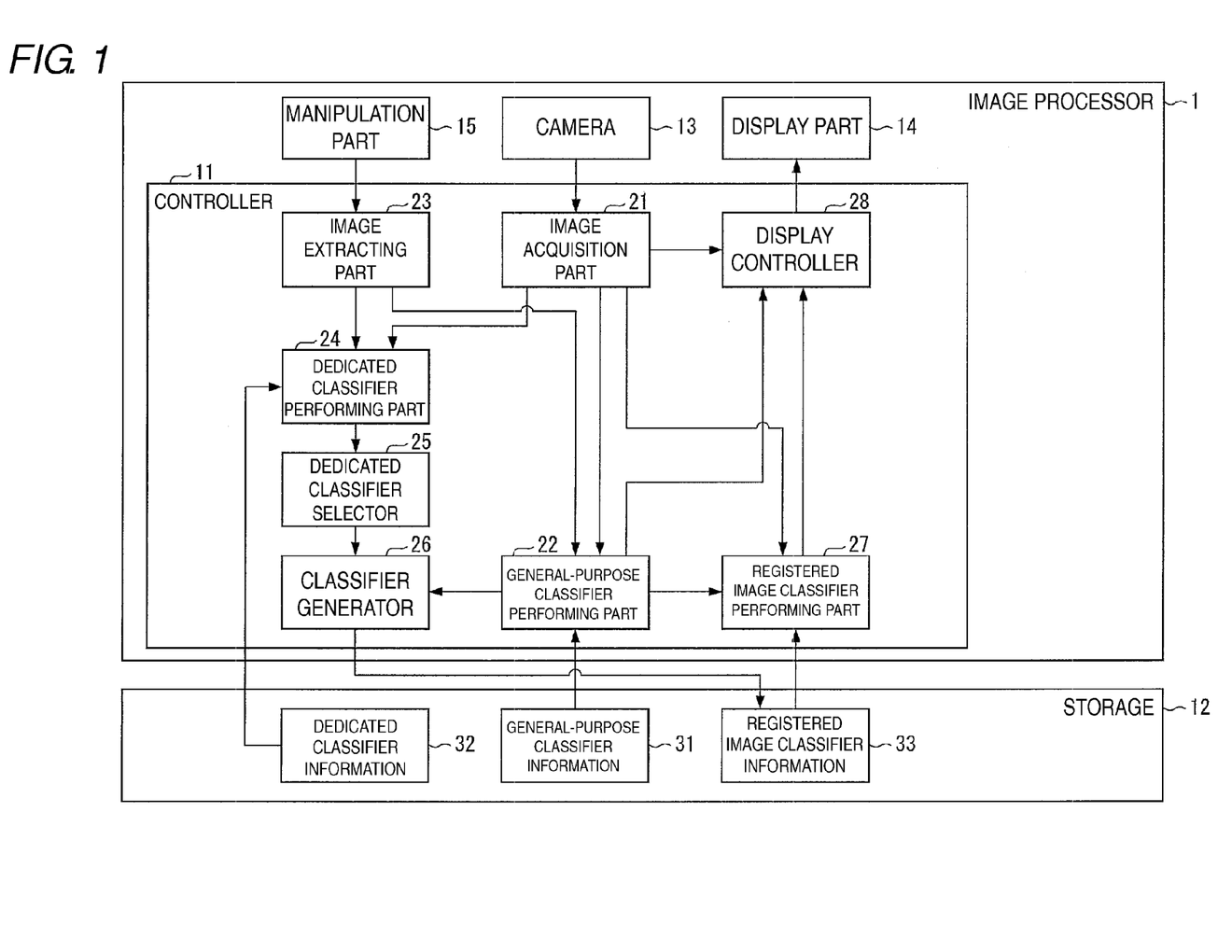
FIG. 1 is a block diagram illustrating an example of a configuration of main parts of an image processor according to an embodiment of the present invention.

A configuration of the image processor will be described below with reference to FIG. 1. FIG. 1 is a block diagram illustrating an example of a configuration of main parts of an image processor 1. As illustrated in FIG. 1, the image processor 1 includes a controller 11, a storage 12, a camera 13, a display part 14, and a manipulation part 15. The image processor 1 may include parts, such as a communication part that conduct communication with another device, a sound input part, and a sound output part. However, the parts are not illustrated because the parts are not related to the feature of the present invention.

The camera 13 photographs the image. The image photographed by the camera 13 is referred to as a photographed image. The camera 13 is mounted in the embodiment. However, the invention is not limited to the embodiment. For example, the camera 13 and the image processor 1 may be separated from each other. An image providing device may be used instead of the camera 13. Any image providing device may be used as long as the image providing device provides a retained or acquired image to another device. Examples of the image providing device include a digital camera, a digital television set, a PC, a mobile phone, a PDA (Personal Digital Assistant), a game machine, and storage devices, such as a USB (Universal Serial Bus) memory.

The display part 14 displays the image according to an instruction of the controller 11. Any display part may be used as the display part 14 as long as the display part displays the image according to the instruction of the controller 11. For example, an LCD (Liquid Crystal Display), an organic EL display, and a plasma display may be applied to the display part 14.

The manipulation part 15 is used in order that a user inputs an instruction signal to the image processor 1 to manipulate the image processor 1. The manipulation part 15 may be constituted by input devices, such as a keyboard, a mouse, a keypad, and a manipulation button. A touch panel in which the manipulation part 15 and the display part 14 are integrally formed may be used. The manipulation part 15 may be remote-control devices, such as a remote controller, which are formed independently of the image processor 1.

The controller 11 performs various operations by executing a program read from the storage 12 onto a temporary storage (not illustrated), and the controller 11 wholly controls the parts included in the image processor 1.

In the embodiment, the controller 11 includes an image acquisition unit 21, a general-purpose classifier performing part 22, an image extracting part 23, a dedicated classifier performing part 24, a dedicated classifier selector 25, a classifier generator 26, a registered image classifier performing part 27, and a display controller 28 as functional blocks. The functional blocks (21 to 28) of the controller 11 are implemented such that a CPU (Central Processing Unit) reads the program, which is stored in a storage device constructed by a ROM (Read Only Memory), onto the temporary storage constructed by a RAM (Random Access Memory), and such that the CPU executes the program.

The image acquisition part 21 acquires the photographed image from the camera 13. The image acquisition unit 21 outputs the acquired photographed image to the general-purpose classifier performing part 22, the dedicated classifier performing part 24, the registered image classifier performing part 27, and the display controller 28.

The general-purpose classifier performing part 22 includes one or a plurality of general-purpose classifiers, and inputs the photographed image acquired from the image acquisition unit 21 to the general-purpose classifier as an input image. The general-purpose classifier performing part 22 causes the general-purpose classifier to perform the detection processing. The general-purpose classifier performing part 22 outputs a detection result of the general-purpose classifier to the display controller 28.

The general-purpose classifier performing part 22 reads general-purpose classifier information from the storage 12 to change the detection target of the general-purpose classifier or to change a feature quantity and a reference range, which are used by the weak classifier constituting the general-purpose classifier during the detection.

Based on a user instruction inputted to the manipulation part 15, the image extracting part 23 specifies a predetermined domain on the photographed image acquired from the image acquisition unit 21, and extracts the specified domain as a registered image. The image extracting part 23 outputs the extracted registered image to the dedicated classifier performing part 24.

The dedicated classifier performing part 24 includes one or a plurality of dedicated classifiers, and inputs the registered image acquired from the image extracting part 23 to the dedicated classifier as the input image. The dedicated classifier performing part 24 causes the dedicated classifier to perform the detection processing.

Instead of the output domain, the dedicated classifier outputs an index indicating superiority or inferiority of the detection result as the detection result. For example, the dedicated classifier outputs a score of the output domain as the index. That is, the final-stage weak classifier of the dedicated classifier outputs the score of the output domain. The dedicated classifier performing part 24 outputs the detection result of the dedicated classifier to the dedicated classifier selector 25.

As used herein, the score means a degree of certainty that the detection target is included in the output domain. For example, the final-stage weak classifier may output a degree of similarity indicating a degree that the target included in the domain is similar to the detection target as the score.

The score of zero is outputted in the case where no output domain exists. In the case where the detection result of the whole dedicated classifier is "no output domain exists", the number of hierarchies of the weak classifiers that perform the detection processing may be outputted as the index.

The dedicated classifier performing part 24 reads dedicated classifier information from the storage 12 to change the detection target of the dedicated classifier or to change the feature quantity and the reference range, which are used by the weak classifier constituting the dedicated classifier during the detection.

The dedicated classifier selector 25 acquires the detection result of the dedicated classifier from the dedicated classifier performing part 24, and selects the dedicated classifier having the highest score (index) based on the acquired detection result. The dedicated classifier selector 25 notifies the classifier generator 26 of the selected dedicated classifier.

In order to detect the target included in the registered image, the classifier generator 26 generates a registered image classifier by replacing some weak classifiers included in the dedicated classifier selected by the dedicated classifier selector 25 with the weak classifiers included in the general-purpose classifier. The classifier generator 26 stores the generated registered image classifier as registered image classifier information in the storage 12 while correlating the registered image classifier with the registered image.

Specifically, the classifier generator 26 acquires the detection result of the general-purpose classifier with respect to the registered image from the general-purpose classifier performing part 22, and specifies the hierarchy in which the weak classifier of the general-purpose classifier can perform the detection processing to the registered image. The classifier generator 26 replaces the weak classifiers up to the specified hierarchy, which are included in the dedicated classifier selected by the dedicated classifier selector 25, with the weak classifiers of the general-purpose classifier to generate the registered image classifier.

For example, it is assumed that each of the general-purpose classifier and the dedicated classifier is constructed by the weak classifiers of 10 hierarchies, and that the weak classifiers to hierarchy 7 of the general-purpose classifier can perform the detection processing to the registered image. In this case, the classifier generator 26 generates the registered image classifier by replacing the weak classifiers of hierarchy 1 to hierarchy 7 of the dedicated classifier with the weak classifiers of hierarchy 1 to hierarchy 7 of the general-purpose classifier. In other words, the weak classifiers of hierarchy 1 to hierarchy 7 of the generated registered image classifier are the weak classifiers of hierarchy 1 to hierarchy 7 of the general-purpose classifier, and the weak classifiers of hierarchy 8 to hierarchy 10 of the generated registered image classifier are the weak classifiers of hierarchy 8 o hierarchy 10 of the dedicated classifier.

The classifier generator 26 may replace the weak classifiers to a predetermined hierarchy, which are included in the dedicated classifier selected by the dedicated classifier selector 25, with the weak classifiers of the general-purpose classifier to generate the registered image classifier.

For example, it is assumed that the weak classifiers to hierarchy 5 are replaced with the weak classifiers of the general-purpose classifier in advance. In this case, the classifier generator 26 generates the registered image classifier by replacing the weak classifiers of hierarchy 1 to hierarchy 5 of the dedicated classifier with the weak classifiers of hierarchy 1 to hierarchy 5 of the general-purpose classifier. In other words, the weak classifiers of hierarchy 1 to hierarchy 5 of the generated registered image classifier are the weak classifiers of hierarchy 1 to hierarchy 5 of the general-purpose classifier, and the weak classifiers of hierarchy 6 to hierarchy 10 of the generated registered image classifier are the weak classifiers of hierarchy 6 to hierarchy 10 of the dedicated classifier.

The registered image classifier performing part 27 reads the registered image classifier information from the storage 12, and generates the registered image classifier based on the registered image classifier information. The registered image classifier performing part 27 inputs the photographed image acquired from the image acquisition unit 21 as the input image to the generated registered image classifier. The registered image classifier performing part 27 causes the registered image classifier to perform the detection processing. The registered image classifier performing part 27 outputs the detection result of the registered image classifier to the display controller 28.

The display controller 28 acquires the photographed image from the image acquisition part 21, and displays the acquired photographed image on the display part 14. The display controller 28 also acquires the detection result from the general-purpose classifier performing part 22 or the registered image classifier performing part 27, and displays the photographed image while superimposing a marker indicating a position of the output domain on the image.

A program and data, which are referred to by the controller 11, are stored in the storage 12. For example, general-purpose classifier information 31, dedicated classifier information 32, and registered image classifier information 33 are stored in the storage 12.

Each of the general-purpose classifier information 31, the dedicated classifier information 32, and the registered image classifier information 33 is used to generate the classifier for detecting a predetermined target. For example, the general-purpose classifier information 31, the dedicated classifier information 32, and the registered image classifier information 33 indicate the number of weak classifiers constituting the classifier, the sequence of the weak classifiers constituting the classifier, and the feature quantity and the reference range, which are used by the weak classifier.

(Registered Image Classifier Generating Processing)

Figure 6:
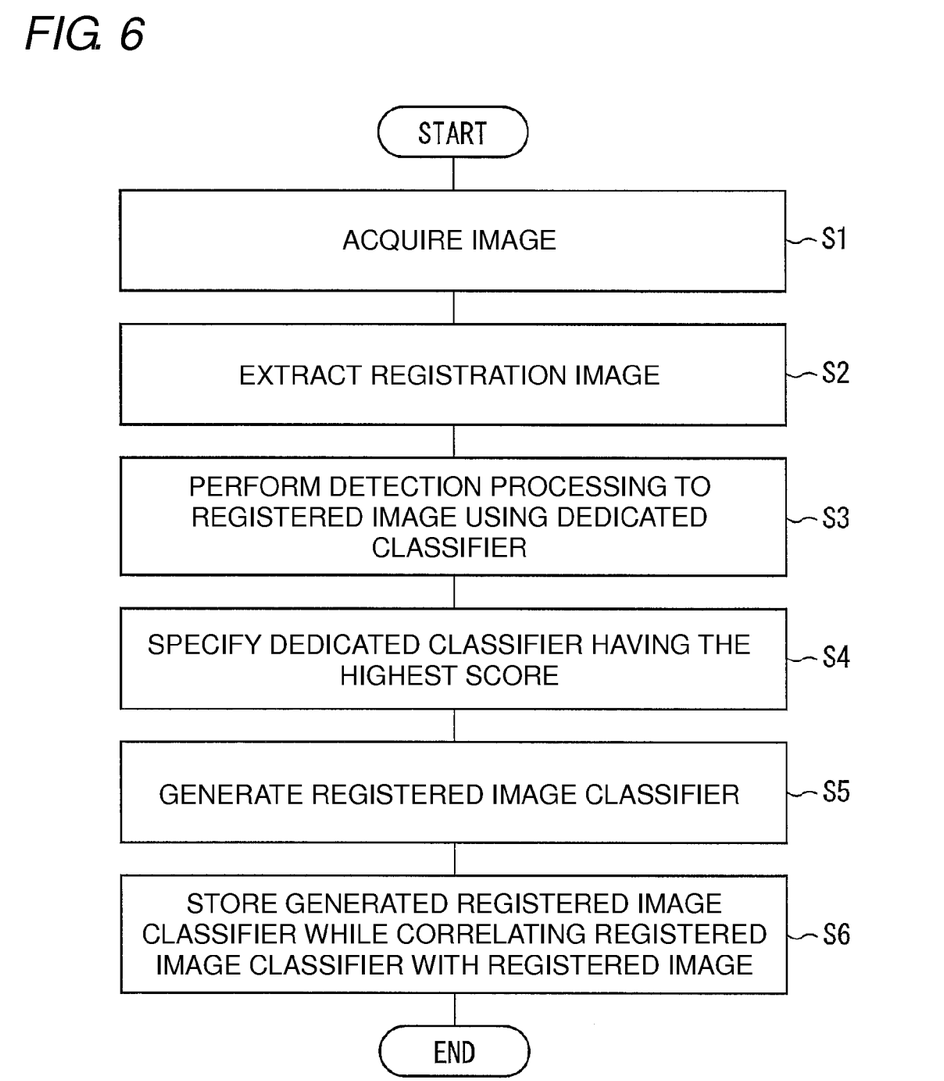
FIG. 6 is a flowchart illustrating an example of registered image classifier generating processing performed by the image processor.

Then, registered image classifier generating processing performed by the image processor 1 will be described with reference to FIG. 6. FIG. 6 is a flowchart illustrating an example of the registered image classifier generating processing performed by the image processor 1.

At this point, it is assumed that the user registers the domain including the target desired by the user as the registered image because the target desired by the user is not detected although the general-purpose classifier performs the detection processing to the photographed image. It is assumed that the dedicated classifier performing part 24 includes five dedicated classifiers.

The image acquisition part 21 acquires the photographed image from the camera 13 (S1). As described above, the target desired by the user is not detected although the general-purpose classifier performs the detection processing to the photographed image. The user manipulates the manipulation part 15 to assign the domain including the target desired by the user on the photographed image. Based on the user instruction inputted to the manipulation part 15, the image extracting part 23 specifies a predetermined domain on the photographed image, and extracts the specified domain as the registered image (S2). The image extracting part 23 outputs the extracted registered image to the dedicated classifier performing part 24.

The dedicated classifier performing part 24 inputs the registered image acquired from the image extracting part 23 to the five dedicated classifiers as the input image. The dedicated classifier performing part 24 causes each dedicated classifier to perform the detection processing (S3). The dedicated classifier performing part 24 outputs the score, which is the output of each dedicated classifier, to the dedicated classifier selector 25.

The dedicated classifier selector 25 acquires the score of each dedicated classifier from the dedicated classifier performing part 24, and selects the dedicated classifier having the highest output score from the five dedicated classifiers (S4). The dedicated classifier selector 25 notifies the classifier generator 26 of the selected dedicated classifier.

In order to detect the target included in the registered image, the classifier generator 26 generates the registered image classifier by replacing some weak classifiers included in the dedicated classifier selected by the dedicated classifier selector 25 with the weak classifiers included in the general-purpose classifier (S5). The classifier generator 26 stores the generated registered image classifier as the registered image classifier information in the storage 12 while correlating the registered image classifier with the registered image.

EXAMPLE 1

An example (Example 1) of the classifier generating processing will be described below based on the specific case.

In Example 1, it is assumed that a "father", a "mother", and a "child", who are humans, and a "dog" that is a pet are taken in the photographed image. It is assumed that a face classifier that detects faces of humans and animals, such as the dog, is used as the general-purpose classifier. It is assumed that the "father", the "mother", and the "child" are detected while the "dog" is not detected as a result of performing the detection processing to the photographed image using the general-purpose classifier. It is assumed that the user registers the domain including the "dog" as the registered image.

It is assumed that five classifiers, in which "dachshund", "pug", "shiba-inu", "chihuahua", and "papillon" are detection targets, are used as the dedicated classifiers. It is assumed that the dog breed of the "dog" is shiba-inu.

It is assumed that the general-purpose classifier and the dedicated classifier are constructed by the weak classifiers of 10 hierarchies. It is assumed that the weak classifiers of hierarchy 1 to hierarchy 5 of the general-purpose classifier are used as the registered image classifier in advance.

In this case, when the dedicated classifier performing part 24 causes each dedicated classifier to perform the detection processing to the registered image, the dachshund classifier, the pug classifier, the shiba-inu classifier, the chihuahua classifier, and the papillon classifier have the scores of "200", "0", "900", "0", and "0", respectively.

As a result, the dedicated classifier selector 25 selects the shiba-inu classifier, and notifies the classifier generator 26 of the selection of the shiba-inu classifier. When receiving the notification, the classifier generator 26 generates the registered image classifier by combining the weak classifiers of hierarchy 1 to hierarchy 5 of the face classifier and the weak classifiers of hierarchy 6 to hierarchy 10 of the shiba-inu classifier.

EXAMPLE 2

Another example (Example 2) of the classifier generating processing will be described below.

It is assumed that Example 2 differs from Example 1 in that the dog breed of the "dog" taken in the photographed image is tosa-inu. It is assumed that the hierarchy of the weak classifier of the general-purpose classifier used in the registered image classifier is the hierarchy in which the weak classifier of the general-purpose classifier can perform the detection processing to the registered image. Other settings are similar to those of Example 1.

When the dedicated classifier performing part 24 causes each dedicated classifier to perform the detection processing to the registered image, each dedicated classifier becomes "no output domain exists". At this point, the hierarchies in which the dachshund classifier, the pug classifier, the shiba-inu classifier, the chihuahua classifier, and the papillon classifier can perform the detection processing are "hierarchy 3", "hierarchy 5", "hierarchy 9", "hierarchy 1", and "hierarchy 6", respectively. Because each dedicated classifier becomes "no output domain exists", the dedicated classifier performing part 24 outputs the number of hierarchies to each of which the dedicated classifier can perform the detection processing as the index to the dedicated classifier selector 25.

As a result, the dedicated classifier selector 25 selects the shiba-inu classifier, and notifies the classifier generator 26 of the selection of the shiba-inu classifier. It is assumed that the weak classifiers to hierarchy 5 can perform the detection processing when the general-purpose classifier performing part 22 causes the general-purpose classifier to perform the detection processing to the registered image. The general-purpose classifier performing part 22 notifies the classifier generator 26 of the result.

At this point, the classifier generator 26 may use the weak classifiers of hierarchy 6 to hierarchy 10 of the shiba-inu classifier that is the dedicated classifier. However, it is assumed that the classifier generator 26 may use the weak classifiers of hierarchy 6 to hierarchy 9 of the shiba-inu classifier because only the weak classifiers to hierarchy 9 of the shiba-inu classifier can perform the detection processing to the registered image. When receiving the notification, the classifier generator 26 generates the registered image classifier by combining the weak classifiers of hierarchy 1 to hierarchy 5 of the face classifier and the weak classifiers of hierarchy 6 to hierarchy 9 of the shiba-inu classifier.

(Registered Image Classifier Detecting Processing)

As described above, the registered image classifier is the combination of the weak classifier of the general-purpose classifier and the weak classifier of the dedicated classifier. For example, like Examples 1 and 2, the registered image classifier is the combination of the weak classifiers of hierarchy 1 to hierarchy 5 of the face classifier that is the general-purpose classifier and the weak classifiers of hierarchy 6 to hierarchy 10 of the shiba-inu classifier that is the dedicated classifier.

In the case where the target included in the registered image is solely detected, the total of weak classifiers of 10 hierarchies including the weak classifiers of hierarchy 1 to hierarchy 5 of the face classifier and the weak classifiers of hierarchy 6 to hierarchy 10 of the shiba-inu classifier perform the processing because only the registered image classifier performs the processing.

On the other hand, in the case where the "father", the "mother", and the "child" and the "dog" that is the target included in the registered image are taken in the photographed image, the image processor 1 causes the general-purpose classifier and the registered image classifier to perform the detection processing.

Specifically, first, the weak classifiers of hierarchy 1 to hierarchy 10 of the general-purpose classifier perform the detection processing. The general-purpose classifier detects the "father", the "mother", and the "child" and the "dog" although the general-purpose classifier does not detect the "dog". Then the registered image classifier performs the detection processing to the photographed image. At this point, the previous detection result is used because the general-purpose classifier has already performed the detection processing to the photographed image. That is, the detection result of the weak classifier of hierarchy 5 is retained when the general-purpose classifier performs the detection processing. When the registered image classifier performs the detection processing, the weak classifiers of hierarchy 6 to hierarchy 10 of the registered image classifier perform the detection processing to the retained detection result.

Although the image processor performs processing of the two classifiers, namely the general-purpose classifier and the registered image classifier, because the overlapping weak classifiers of the registered image classifier which are also weak classifiers of the general purpose classifier do not perform the detection processing, a processing load or a processing time of the detection processing can be reduced.

It is assumed that weak classifiers of a plurality of registered image classifiers overlap each other. In the case where the plurality of registered image classifiers perform the detection processing, the processing amount or the processing time of the detection processing can be reduced by use of the detection result.

Because the registered image classifier includes the weak classifier of the general-purpose classifier, a difference in processing time or processing rate between the general-purpose classifier and the registered image classifier is smaller than a difference in processing time or processing rate between the general-purpose classifier and the dedicated classifier. Therefore, the processing time or the processing rate of the registered image classifier can be predicted from the processing time or the processing rate of the general-purpose classifier.

(Supplements)

The present invention is not limited to the above embodiment, but various changes and modifications can be made without departing from the scope of the invention. That is, the present invention also includes the embodiment obtained by combining technical means, which are properly changed without departing from the scope of the present invention.

Finally Each block of the image processor 1, particularly the controller 11 may be constructed by a hardware logic, or by software using a CPU (Central Processing Unit) as follows.

That is, the image processor 1 includes the CPU that executes a command of a control program implementing each function, a ROM (Read Only Memory) in which the control program is stored, a RAM (Random Access Memory) in which the control program is expanded, and a storage device (recording medium), such as a memory, in which the control program and various pieces of data are stored. The object of the present invention can also be achieved such that the recording medium in which a program code (an executable format program, an intermediate code program, a source program) of the control program for the image processor 1, which is the software implementing the above functions, is stored while being readable by a computer is supplied to the image processor 1, and such that the computer (or the CPU or an MPU (Micro Processing Unit)) reads and executes the program code recorded in the recording medium.

Examples of the recording medium include tape systems, such as magnetic tape and cassette tape, disk systems including magnetic disks, such as floppy disk (registered trademark) and a hard disk, and optical disks, such as a CD-ROM, an MO an MD, a DVD, and a CD-R, card systems, such as an IC card (including a memory card) and an optical card, and semiconductor memory systems, such as a mask ROM, an EPROM, an EEPROM and a flash ROM.

The image processor 1 is configured to be able to be connected to a communication network, and the program code may be supplied through the communication network. There is no particular limitation to the communication network. Examples of the communication network include the Internet, an intranet, an extranet, a LAN, an ISDN, a VAN, a CATV communication network, a virtual private network, a telephone line network, a mobile communication network, and a satellite communication network. There is no particular limitation to a transmission medium constituting the communication network. Examples of the transmission medium include wired lines, such as IEEE 1394, a USB, a power-line carrier, a cable TV line, a telephone line, and an ADSL line, and wireless lines, such as infrared rays including IrDA and a remote controller, Bluetooth (registered trademark), 802.11 wireless, HDR, a mobile telephone network, a satellite line, and a terrestrial digital network. The present invention can also be implemented in the form of a computer data signal embedded in a carrier wave. In this case, the program code is embodied by electronic transmission.

The present invention can be applied to the image processor that detects a predetermined material object on the image.

The invention claimed is:

1. An image processor comprising:
   a general-purpose classifier configured to detect a predetermined large classification target, the general-purpose classifier including one or a plurality of weak classifiers in which a next-stage weak classifier performs detection processing to a preceding-stage output domain; and
   a dedicated classifier configured to detect a small classification target which is a subdivision of the large classification target, the dedicated classifier including one or a plurality of weak classifiers in which a next-stage weak classifier performs the detection processing to the preceding-stage output domain; wherein the image processor comprises:
   an image acquisition part configured to acquire a photographed image photographed by a camera;
   an image extracting part configured to extract a registered image including a domain assigned by a user from the photographed image;
   a dedicated classifier performing part configured to cause the dedicated classifier to perform the detection processing to the registered image extracted by the image extracting part;
   a dedicated classifier selector configured to select the dedicated Classifier having a highest index indicating superiority or inferiority of a detection result; and
   a classifier generator configured to generate a registered image classifier to detect a target included in the registered image by replacing some weak classifiers included in the dedicated classifier selected by the dedicated classifier selector with the weak classifiers included in the general-purpose classifier.

2. The image processor according to claim 1, wherein the classifier generator generates the registered image classifier by replacing the weak classifiers of the dedicated classifier selected by the dedicated classifier selector to a hierarchy in which the weak classifier of the general-purpose classifier can successfully detect the target in the registered image with the weak classifiers to the same hierarchy of the general-purpose classifier.

3. The image processor according to claim 1, wherein the classifier generator generates the registered image classifier by replacing the weak classifiers to a predetermined hierarchy of the dedicated classifier selected by the dedicated classifier selector with the weak classifiers to the same predetermined hierarchy of the general-purpose classifier.

4. The image processor according to claim 1, wherein the dedicated classifier performing part outputs a hierarchy, in which the dedicated classifier can successfully detect the target in the registered image, as the index in the case where each dedicated classifier does not output the output domain when the dedicated classifier performing part causes the dedicated classifier to perform the detection processing to the registered image, and
   the dedicated classifier selector selects the dedicated classifier having a largest number of hierarchies.

5. The image processor according to claim 4, wherein the classifier generator generates the registered image classifier using the weak classifiers of the dedicated classifier to the hierarchy in which the weak classifier can successfully detect the target in the registered image among the weak classifiers of the dedicated classifier selected by the dedicated classifier selector.

6. An image processing method for an image processor including a general-purpose classifier configured to a predetermined large classification target, the general-purpose classifier including one or a plurality of weak classifiers in which a next-stage weak classifier performs detection processing to a preceding-stage output domain; and a dedicated classifier configured to detect a small classification target which is a subdivision of the large classification target, the dedicated classifier including one or a plurality of weak classifiers in which a next-stage weak classifier performs the detection processing to the preceding-stage output domain, the image processing method comprising the steps of:

acquiring a photographed image photographed by a camera;

extracting a registered image including a domain assigned by a user from the photographed image;

causing the dedicated classifier to perform the detection processing to the registered image extracted in the image extracting step;

selecting the dedicated classifier having a highest index indicating superiority or inferiority of a detection result; and generating a registered image classifier to detect a target included in the registered image by replacing some weak classifiers included in the dedicated classifier selected in the dedicated classifier selecting step with the weak classifiers included in the general-purpose classifier.

7. A non-transitory computer-readable recording medium recording a control program that operates the image processor according to claim 1.

* * * * *